United States Patent [19]
Areaux et al.

[11] Patent Number: 5,211,744
[45] Date of Patent: May 18, 1993

[54] METHOD AND MEANS FOR IMPROVING MOLTEN METAL FURNACE CHARGING EFFICIENCY

[75] Inventors: Larry D. Areaux, Nathrop, Colo.; Robert J. Behnke, Bloomfield Hills, Mich.

[73] Assignee: Premelt Systems, Inc., Kalamazoo, Mich.

[21] Appl. No.: 771,041

[22] Filed: Oct. 2, 1991

[51] Int. Cl.$^5$ .............................................. C22B 9/16
[52] U.S. Cl. ...................................... 75/594; 75/686; 75/687; 75/709; 266/158; 266/205; 266/207; 266/901
[58] Field of Search ............... 75/686, 687, 709, 594; 266/158, 205, 207, 901

[56] References Cited

U.S. PATENT DOCUMENTS

| | | | |
|---|---|---|---|
| 2,402,498 | 6/1946 | Kohlhepp | 75/687 |
| 4,353,532 | 10/1982 | Jay | 75/686 |
| 4,498,523 | 2/1985 | Bowman et al. | 75/687 |
| 4,601,750 | 7/1986 | Robak et al. | 75/687 |
| 4,702,768 | 10/1987 | Areaux | 75/687 |
| 4,710,126 | 12/1987 | Areaux | 432/58 |
| 4,721,457 | 1/1988 | Areaux | 432/58 |
| 4,872,907 | 10/1989 | Areaux | 75/687 |

FOREIGN PATENT DOCUMENTS 47932 10/1987 Japan .................................... 75/687

*Primary Examiner*—Melvyn J. Andrews
*Attorney, Agent, or Firm*—Gordon W. Hueschen

[57] ABSTRACT

Utilization of metal chips, especially scrap metal chips, particularly brass and aluminum, by introduction of the metal chips into a pool of molten metal of which they are formed or an alloy thereof, with minimization of fuel cost, heat loss, and minimal conversion of the metal at the surface of the molten metal pool to metal oxide, as well as an increase in the yield of utilizable metal from the remelting or recycling operation, by maintaining a non-oxidizing atmosphere at the surface of the molten metal pool and optionally utilizing vaporized residual impurities from chips being recycled such as oil, lacquer, or similar vaporizable impurity to assist in maintaining the non-oxidizing atmosphere, thereby permitting elimination of impurity-removal steps previously required for preparation of the chips for recycling by introduction into such a molten metal pool, and thereby also conveniently and simultaneously substantially reducing environmental pollution from vaporizable contaminants, fumes, and decomposition products of combustion thereof. Apparatus for use in the process, including a furnace charge-well cover and associated hood, is also disclosed.

35 Claims, 4 Drawing Sheets

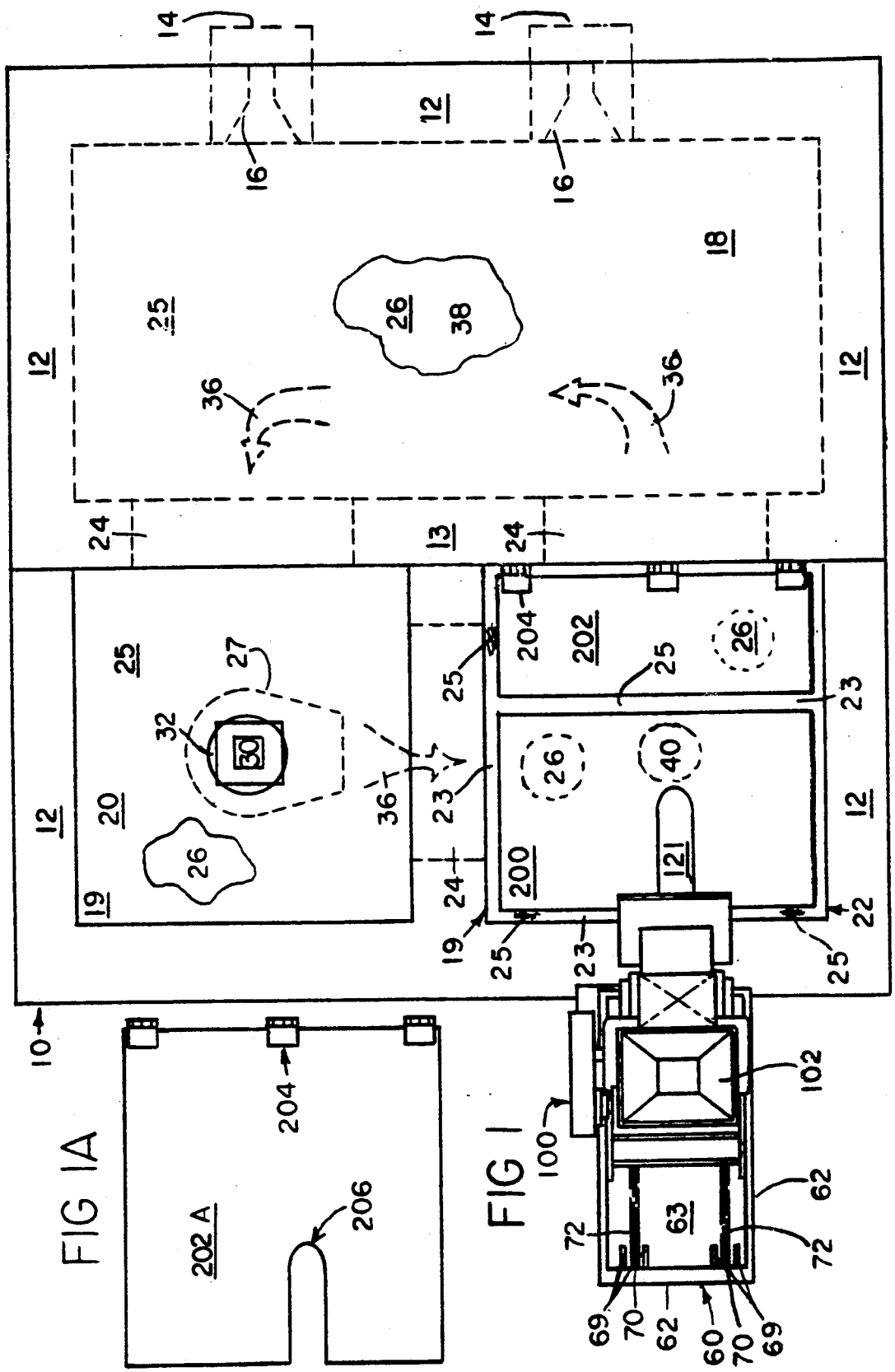

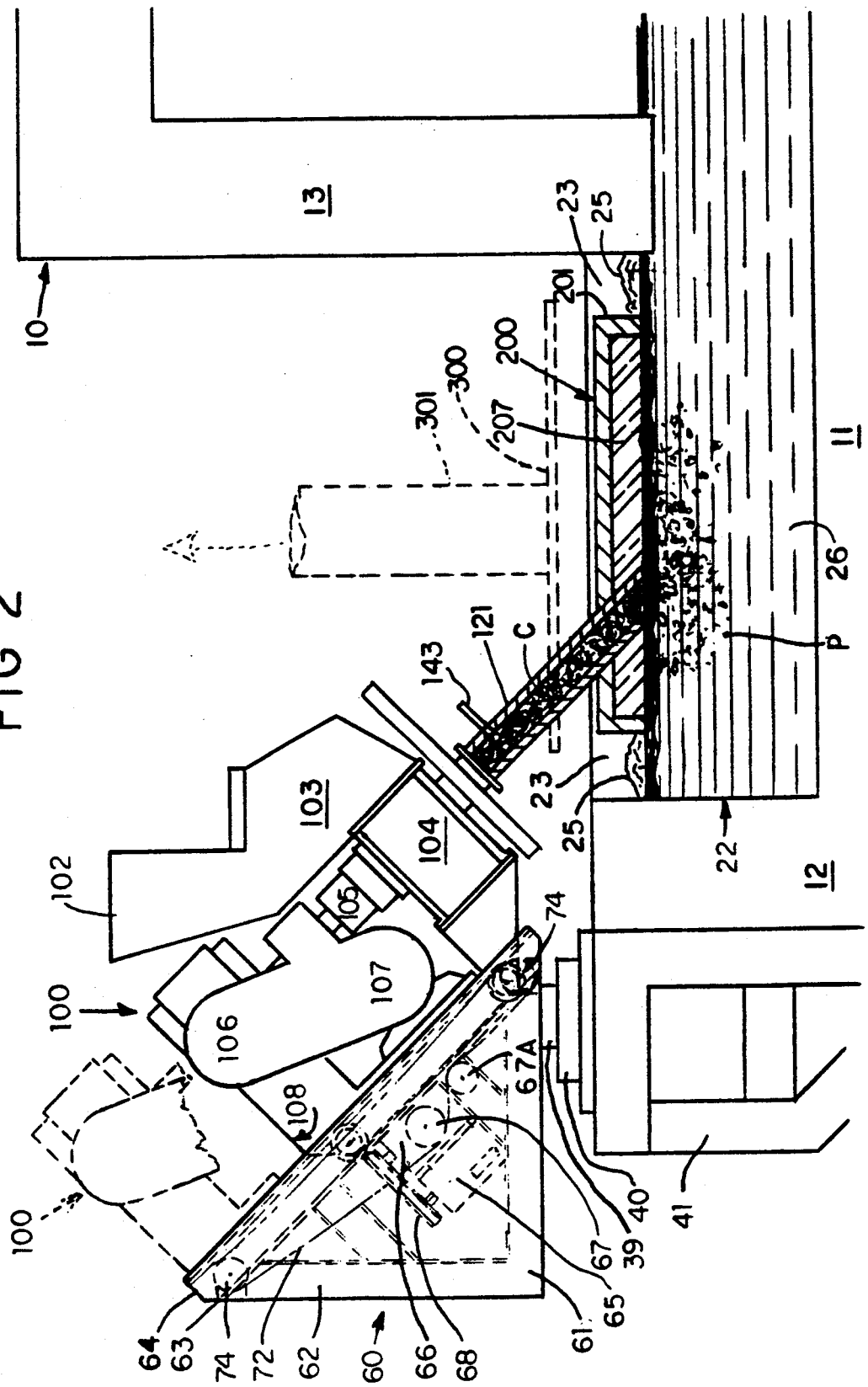

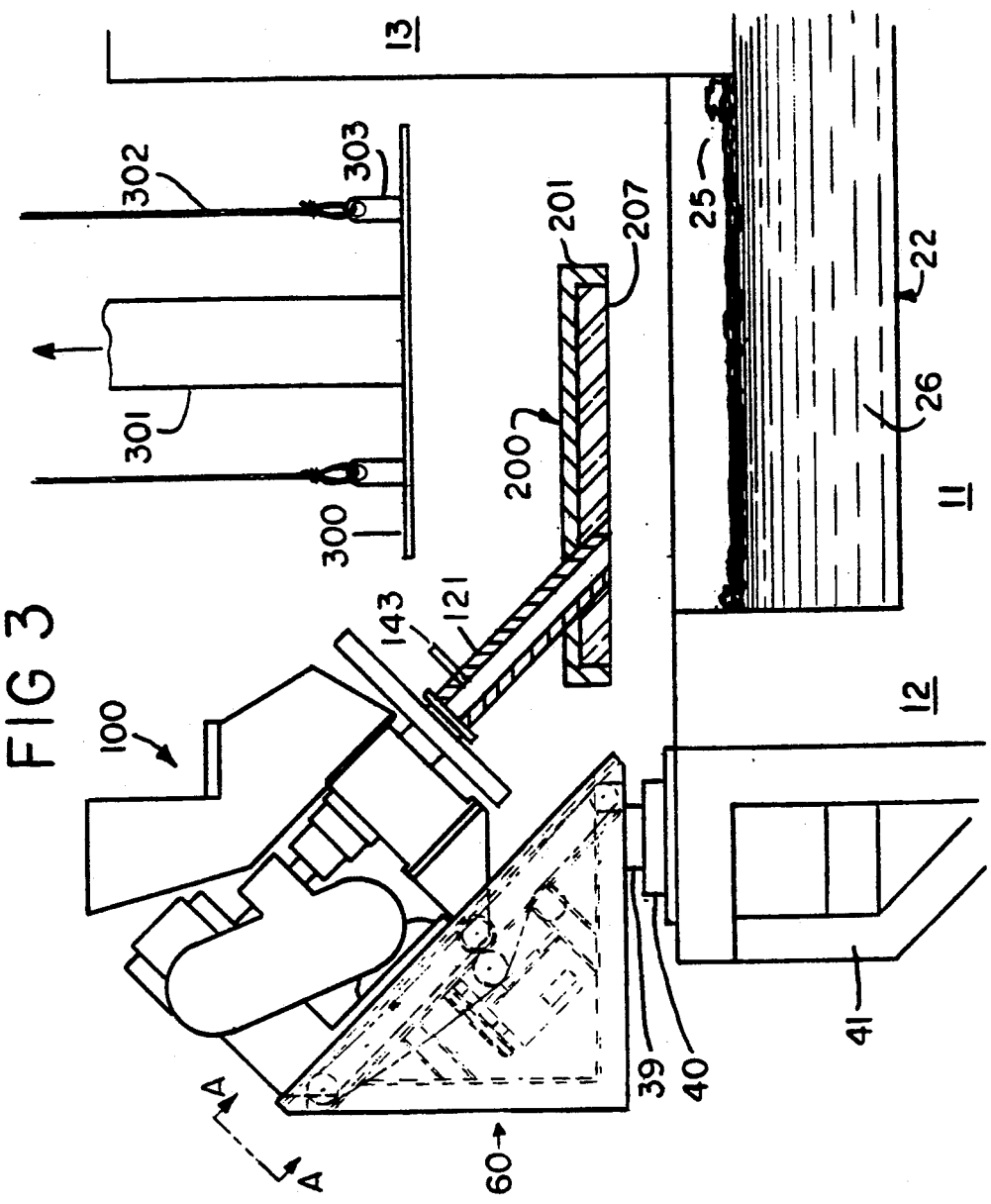

METHOD AND MEANS FOR IMPROVING MOLTEN METAL FURNACE CHARGING EFFICIENCY

BACKGROUND OF THE INVENTION

1. Field of the Invention

Utilization of metal chips, especially scrap metal chips, particularly brass, aluminum, magnesium, titanium, and alloys thereof, by introduction of said metal chips into a mass of molten metal of which they are formed or an alloy thereof and at or below the surface thereof.

Minimizing fuel cost, heat loss, and conversion of the metal at the surface of the molten mass to metal oxide, as well as increasing the yield of utilizable metal from such remelting or recycling operation to nearly the theoretical, by maintaining a non-oxidizing atmosphere or environment at the surface of the molten metal mass and, optionally and advantageously, utilizing vaporizable residual impurities on chips being recycled such as oil, lacquer, or like vaporizable impurity to assist in maintaining the non-oxidizing atmosphere or environment, thereby optionally and advantageously permitting the elimination of previously-employed impurity-removal steps in preparation of the chips for industrial utilization or recycling by introduction into the said molten metal mass; conveniently and simultaneously eliminating environmental contamination from vaporizable impurities, fumes, and decomposition products thereof. Apparatus suitable for use in the process.

2. Prior Art

The state of the art has been fully reviewed in the prior U.S. patents of one of us, namely, U.S. Pat. Nos. 4,702,768, 4,710,126, 4,721,457, and 4,872,907, the disclosures of which patents are incorporated herein by reference. Although much progress has been made in the field of conversion of metal chips, and especially recycled metal chips, into utilizable industrial metal by the remelting thereof, as indicated by these patents and their solutions to some of the most significant problems involved, serious economic and environmental shortcomings still remain in the overall procedure, which act as both industrial and economic impediments to the fullest utilization and reutilization of metal chips and their conversion into industrially-utilizable "new" metal.

Some of the most important drawbacks involve excessive fuel cost because of heat losses from the furnace in which the mass of molten metal is contained and loss of excessive amounts of metal by conversion to metal oxides because of oxidation of the metal at the surface of the molten metal bath or pool, both especially in the charge well of the furnace; excessive environmental pollution problems due to combustion of vaporizable and flammable chip contaminants such as oil, lacquer, or the like, at the surface of the molten metal bath in the charge well; and the necessity of employing thermal and/or chemical steps for burning off of such vaporizable and flammable contaminants from the chips, as in a rotary-drum type combustion apparatus, to eliminate such contaminants to as great an extent as possible before introduction of the chips into the molten metal bath so as to eliminate excessive flaming and combustion of such vaporized impurities at the surface of the molten metal bath, especially in the charge well, with its attendant difficulty of removal of products of combustion and concurrent pollution of the environment from such undesirable byproducts of the procedure.

Although it is still necessary to dry the metal chips, as by the employment of a chip wringer, ordinarily in combination with a heated cyclone separator or rotary dryer, such as the type manufactured by Premelt and sold under such trademark, to provide essentially dry metal chips, because such "dryness" is essential to avoid highly undesirable and even explosive reactions involving dissociation of water carried thereon and spontaneous combustion of the evolved hydrogen gas, before introduction of the chips into the charge well of a reverberatory furnace, or into a channel-type induction furnace or a coreless-type induction furnace, usually after separation of the chips of a nonferrous type from ferrous or other magnetic-type chips, the previous practice of chemically and/or thermally burning off vaporizable and flammable impurities such as oil, grease, lacquer, and the like has added serious economic disadvantages and impediments to the fullest utilization and re-utilization of metal chips by conversion into industrially-utilizable metal, especially "new" metal as obtained by recycling of metal chips from the fragmentation of previously-used commercial forms of the metal, such as aluminum or aluminum alloy cans or other used beverage container or the like.

Also, although recent developments in the art have permitted substantial improvements by way of introduction of the metal chips, and especially scrap metal chips, into the molten metal pool at or below the surface thereof by means of a chip-charging device of the nature of a compacting briquetter or a compacting extruder, no effective method or means for elimination of the foregoing shortcomings of the prior art have heretofore been available, despite a long-standing need for the same in order to facilitate and render more economic the conversion of such metal chips into industrially-utilizable metal which can be employed for all of the usual purposes and in all of the usual forming equipment, such as extruders, dies, and the like, where metal chips themselves are of course of no utility whatever.

The method and apparatus of the present invention provide long-awaited improvements in both the process and the apparatus for the utilization of metal chips involving the necessary step of introducing the same into a molten metal bath at the commencement of their re-entry into the stream of commerce, essentially by the maintenance of a non-oxidizing atmosphere at the surface of the molten metal bath or pool in the furnace charge well and the employment of appropriate charge-well cover means for the retention of inert or vaporized gases at the surface of the molten metal pool or mass and, advantageously, appropriate associated hood means for the removal of the products of combustion of the vaporizable and flammable gases, which do escape from the charge well, from the immediate vicinity and to a removed location where they can more conveniently be eliminated with minimization of environmental contamination.

OBJECTS OF THE INVENTION

It is an object of the invention to provide a new and improved process or method for the utilization of metal chips, especially scrap metal chips, particularly brass and aluminum and alloys thereof, by introduction of said metal chips into a mass of molten metal, ordinarily metal of which they are formed or an alloy thereof, with minimization of fuel cost, heat loss, and minimal conversion of the metal at the surface of the molten mass to metal oxide, as well as to effect an increase in the yield of utilizable metal from such remelting or recycling operation by maintaining a non-oxidizing atmosphere or environment, at the surface of the molten metal mass and, optionally and advantageously, utilizing vaporizable residual impurities on chips being recycled such as oil, grease, lacquer, or like hydrocarbon and/or polymeric vaporizable impurity, to assist in maintaining the non-oxidizing atmosphere or environment, thereby optionally and advantageously permitting the elimination of previously-employed impurity-removal steps in preparation of the chips for industrial utilization or recycling by introduction into the said molten metal mass or pool and advantageously and conveniently and simultaneously eliminating environmental contamination from vaporizable contaminants, fumes, and decomposition products thereof. A further object is to provide apparatus suitable for use in the process, especially such apparatus comprising novel charge-well cover means and such cover means with complementary hood means and associated conduitry, which is uniquely and advantageously designed for such use. Other objects of the invention will become apparent hereinafter, and still other objects will be obvious to one skilled in the art to which this invention pertains.

SUMMARY OF THE INVENTION

The present invention, then, comprises the following aspects, inter alia, singly or in combination:.

A method for the industrial utilization of metal chips which involves the introduction of metal chips into a molten metal pool for melting therein, comprising the steps of:

providing metal chips and introducing said chips into said well, and providing a non-oxidizing atmosphere at the surface of the molten metal pool in the said charge well; such a method wherein the non-oxidizing atmosphere at the surface of the molten metal pool is provided by an inert gas; such a method wherein the non-oxidizing atmosphere at the surface of the molten metal pool in the charge well is provided by gas generated by vaporization of vaporizable contaminants on metal chips introduced into the charge well; such a method wherein the non-oxidizing atmosphere at the surface of the molten metal pool in the charge well is provided by a combination of an inert gas and gas generated by vaporization of vaporizable contaminants on metal chips introduced into said charge well; such a method wherein the non-oxidizing atmosphere at the surface of the molten metal pool in the charge well is provided by providing an inert gas at the surface of the molten metal pool or by generating gas within said molten metal pool by vaporizing vaporizable contaminants on chips introduced into said pool, and retaining said gas at the surface of said molten metal pool with a heat- and flame-resistant cover over at least a substantial portion of said molten metal pool in said charge well; such a method wherein at least a portion of said cover is moveable into and out of position at the surface of the molten metal pool in the charge well and including the step of moving said moveable portion of said cover into position atop said pool; such a method wherein said moveable portion of said cover is moved into position atop said molten metal pool in the charge well concurrently with the insertion of delivery conduit of a chip-charging device into said charge well; such a method wherein the metal chips introduced into said well comprise aluminum or magnesium or an alloy thereof; such a method wherein the metal chips introduced into said well comprise fragmented aluminum or aluminum alloy cans; such a method wherein the metal chips introduced into said charge well comprise used beverage can fragments; such a method including the step of providing exit ports in or around said charge-well cover to permit the escape of gas from within said molten metal pool which is not retained by said cover and collecting the same or products of combustion thereof; such a method including the step of collecting and entraining effluent gas and products of combustion thereof escaping from said exit ports in an air stream and decontaminating the same before releasing them into the environment; such a method wherein the inert gas comprises nitrogen or argon; such a method wherein the non-oxidizing atmosphere is generated by the vaporization of oil, grease, other hydrocarbons, lacquer, or other vaporizable material contained as a contaminant or impurity on metal chips introduced into said molten metal pool in said charge well; such a method wherein at least a portion of said cover is upwardly and downwardly moveable with relation to the height of the molten metal pool in said charge well and its movement is coordinated therewith; such a method wherein exit ports are provided in or around said cover when said cover is in place over said charge well to permit the controlled escape of gas from said charge well; such a method wherein an opening is provided in said cover for the passage of a delivery conduit of a chip-charging device therethrough so as to permit the charging of metal chips into said charge well when said cover is in place on said charge well, and introducing metal chips into said charge well through said delivery conduit; such a method wherein said cover or a portion thereof is connected to or integral with a delivery conduit of a chip-charging device for movement therewith and including the step of moving said cover or said portion thereof together with said delivery conduit into and out of position with respect to said charge well and said molten metal pool therein; such a method wherein said collection and entrainment of said gas and products of combustion thereof is effected by providing a hood and associated conduitry superposed above said charge well and said molten metal pool therein and adjacent said exit ports; such a method wherein said cover comprises a refractory material and including the step of contacting said refractory material with the surface of said molten metal pool; such a method wherein said cover comprises a downwardly-opening cavity containing a refractory material and including the step of contacting the said refractory material in said cavity with the surface of said molten metal pool.

Moreover, apparatus for use in conjunction with the charge well of a furnace having therein a molten metal pool into which metal chips are introduced for melting, comprising a heat- and flame-resistant cover adapted to lie at or in close proximity to the surface of said molten metal pool, to cover at least a substantial portion of the area of said charge well, and to retain inert gas or gas generated by vaporization of vaporizable contaminants introduced into said molten metal pool at the surface of said molten metal pool in said charge well over a substantial portion of the surface thereof and thus to maintain a non-oxidizing atmosphere at the surface of said molten metal pool; such an apparatus including means for moving said cover or a moveable portion thereof into and out of said charge well and into and out of proximity to and contact with said molten metal pool therein; such an apparatus wherein said cover comprises an opening for the passage of a delivery conduit of a chip-charging device therethrough so as to permit introduction of metal chips into said molten metal pool in said charge well when said cover is in place thereon; such an apparatus wherein said cover or a moveable portion thereof is associated with a moveable delivery conduit of a chip-charging device for movement together with said delivery conduit; such an apparatus wherein said charge-well cover or a moveable portion thereof is connected to or integral with a delivery conduit of a chip-charger and moveable together therewith; such an apparatus wherein at least a portion of said charge-well cover is hingedly-connected with said charge well; such an apparatus wherein said cover is upwardly and downwardly moveable with relation to the height of the molten metal pool in said charge well; such an apparatus wherein said cover comprises a refractory material; such an apparatus wherein said cover comprises a downwardly-opening cavity containing refractory material; such an apparatus including associated means for collecting and entraining gas and products of combustion thereof emanating from said molten metal pool in the form of a superposed hood and associated conduitry; such an apparatus wherein said hood is moveable upwardly and downwardly along with said charge-well cover or a moveable portion thereof; and finally such an apparatus in place in a furnace charge well.

GENERAL DESCRIPTION OF THE INVENTION

Pre-dried metal chips, e.g., of aluminum or aluminum alloy, are introduced into the charge well of a reverberatory furnace or like furnace having a charge well, at or under the surface of the molten metal mass or pool in the charge well, by means of a chip-charging device such as a compacting briquetter or a compacting extruder, advantageously provided with a delivery conduit for delivering the compacted chips or briquettes to the molten metal pool at or beneath the surface thereof. The delivery conduit is provided with an inlet for the introduction of an inert gas, such as nitrogen or argon, thereinto, for the prevention of oxidation of the chips en route into the molten metal bath, but also for purposes of providing an inert gas at the surface of the molten metal pool in the charge well of the furnace. The chips melt into and become a part of the molten metal pool, generally of the same type of metal as the chips or an alloy thereof, in accord with usual procedure. However, according to the present invention, a suitable cover for the charge well of the furnace is provided at or about the surface thereof. This cover generally occupies all or nearly all of the area of the top surface of the molten metal pool in the charge well, except for the provision of some circumferential or marginal areas, which are herein referred to as "exit ports". One or more exit ports may also be provided in the cover proper, should that be desired. The cover generally comprises a heat- and flame-resistant material, and usual refractory materials, such as ceramic board or block, high-temperature-resistant ceramic blanket (such as Fibrafax TM), or even high-temperature steel or cast iron, or combinations of ceramic and steel or cast iron such as ceramic-clad steel or iron, are satisfactory. According to the invention, the inert gas introduced into the molten metal pool along with the chips being recycled rises to the surface and is retained at the surface of the molten metal pool by means of the said charge-well cover. The cover may be concavely arcuate in nature with a downwardly-opening cavity for retention of gases therein, or may have downwardly-extending circumferential flanges, or may have the inverted box-like structure shown in the drawings, with ceramic or other refractory material usually within the thus-provided cavity, but in any event is designed so as to retain, capture, or entrap the inert gas at the surface of the molten metal pool in the charge well, for which purpose a refractory-filled downwardly-opening cavity, e.g., in the form of the aforementioned inverted box-like structure, is especially effective. In this manner, the atmosphere or environment at the surface of the molten metal pool in the charge well is provided and maintained in a non-oxidizing condition, as would not otherwise be the case without the charge-well cover and the presence of the inert gas. Because of this non-oxidizing atmosphere at the surface of the molten metal pool, the molten metal in the pool does not oxidize from exposure to the air, at least not to the extent previously the case. Thus, the oxidation of the metal in the pool, which usually gives rise to a surface film of metal oxide, is prevented or at least greatly reduced beneath the said cover. In addition, due to the presence of the said cover, the heat loss from the top surface of the molten metal pool in the charge well is likewise greatly reduced. This constitutes a description of the first method and apparatus aspects according to the present invention.

When exit ports are provided around the edges of the charge-well cover, or present in the body thereof, vaporizable impurities, such as oil or lacquer or like vaporizable and flammable contaminants, will vaporize from the chips upon introduction into the pool, which is usually maintained at a temperature in the neighborhood of 1400° F. (760° C.) and rise to the surface. If there is no exit port left, these vapors will collect under the charge-well cover along with the inert gas and contribute to the establishment of a non-oxidizing atmosphere at the surface of the molten metal pool in the charge well. When exit ports are provided, such vaporizable and flammable impurities will not only collect beneath the said charge-well cover, but will exit from the top surface of the molten metal pool in the charge well, as is usually the case over the entire surface of the charge well and, upon contact with the oxygen in the air, burst into flame. However, as will be apparent, due to the presence of the charge-well cover, according to the present invention these exit ports will be in predetermined areas at the top surface of the charge well, so that the position and amount of such vapors escaping and flaming can be controlled and, of course, appropriately channeled to the exterior as by means of a hood, which will be further described hereinafter.

Now, when it is desired to eliminate the inert gas, or reduce the amount thereof employed, this can be done by the employment of chips which have sufficient vaporizable impurities remaining thereon, such as the aforementioned oil, grease, lacquer, hydrocarbon or polymeric or like material, which is quite common in beverage can linings, and the vaporized gases from such source, which rise in the molten metal pool upon contact of the metal chips having such impurities thereon therewith, can be used effectively in the same manner as the inert gas, for the provision of a non-oxidizing atmosphere at the surface of the molten metal pool, without the presence of any, or with a diminished amount if desired, of inert gas as fed through the delivery conduit of the chip charger or otherwise provided at the surface of the molten metal pool in the charge well. For example, simple bubbling of the inert gas into the pool through a suitable heat-resistant tube, preferably at or near the surface thereof, will suffice in particular circumstances, as will be apparent to one skilled in the art. Such a tube, like the delivery conduit of the chip-charging device, may of course be provided from a suitable material such as graphite, silica, silicon carbide, or ceramic, as will again be apparent to one skilled in the art.

It will also immediately be apparent to one skilled in the art that a portion or all of the charge-well cover may be stationary, whereas another portion may be moveable, as for example hinged, for clean-out purposes, or for movement into proximity or contact with the surface of the molten metal pool in the charge well because of attachment to or even being integral with the delivery conduit of the chip-charging device involved or by other means.

Regardless of the exact manner in which the charge-well cover is designed, and whether in one unitary piece or in several pieces, and whether one piece is fixed or stationary whereas another piece of the entire cover is moveable, the principle is the same. The charge-well cover retains the escaping inert gas and/or gas generated from the vaporizable impurities on the chips, which collects beneath the charge-well cover and accordingly eliminates the possibility of oxidation of the top surface of the molten metal pool in such area, while at the same time reducing the amount of heat loss from escaping heat at the surface of the molten metal pool directly beneath said cover.

As to the provision of exit ports, which has already been mentioned, the flammable vapors, from the oil or lacquer or the like from fragmented can linings or the like, which dissociate from the metal chips in the metal pool, will in any event rise to the surface and find an escape route to the atmosphere through the exit ports conveniently provided for such purpose, unless the charge-well cover completely blocks the area constituting the top surface of the molten metal pool in the charge well, and will as previously stated become oxidized and flame, with resulting soot and contamination of the atmosphere, which has been one major complaint of environmentalists in connection with the employment of reverberatory furnaces and like equipment for the melting or remelting of metal chips.

After first providing an area at the surface of the metal pool which is characterized by the non-oxidizing environment or atmosphere, and providing limited exit ports for the exit of oxidizable and flammable gases vaporizing from the impurities present on the chips in the molten metal pool, the present invention goes further and provides associated hood means above the surface of the molten metal pool in the charge well, particularly over such exit ports as are provided, along with associated conduitry, so that the products of combustion of the escaping vaporized and flammable gasses from the impurities present on the chips may be exhausted into a removed or remote area, considerably distant from the furnace itself, where they may be led into an appropriate pollution-eliminating structure or device such as a bag house, a combustion burner, advantageously in conjunction with a cyclone separator, or any other suitable means for effecting the complete combustion of the materials evolved from the oil, grease, lacquer, paint, or like material present as an impurity on the chips introduced into the molten metal pool.

Finally, one particular embodiment of the invention involves the attachment of a portion of the charge-well cover to the delivery conduit of the chip-charger employed, which may be retracted alone or together with the entire chip-charging apparatus so as to move the delivery conduit into contact with and out of contact with the molten metal pool, with a portion or all of the charge-well cover attached thereto or integral therewith. Of course, the retraction may be associated with pivoting, elevating, or any other suitable means for removing the delivery conduit of the chip-charging apparatus from its contact with the molten metal pool and, likewise, when all or a portion of the charge-well cover is attached thereto or integral therewith, this cover will also be moveable along with the delivery conduit of the chip charger employed or with the entire chip-charging apparatus, depending upon the mechanism employed for removal of the chip charger delivery conduit from contact with the molten metal pool and for bringing the delivery conduit into contact therewith, as will be well understood by one skilled in the art.

It will also be well understood by one skilled in the art that inert gas can be used alone to provide the non-oxidizing atmosphere or environment when most convenient, or that an inert gas can be employed along with gas from the vaporizable impurities present on the chips charged into the molten metal pool in the charge well, to effect the said non-oxidizing environment or atmosphere at the surface of the molten metal pool, or even that the gas evolved from the vaporizable impurities on the chips charged into the molten metal pool may be used alone to effect the said non-oxidizing atmosphere or environment when that is most convenient.

It will also be readily apparent to one skilled in the art that, since the present invention contemplates, for charging into the molten metal pool, chips which contain impurities such as oil, grease, other hydrocarbons, lacquers, polymers, acrylates, and so on, which impurities are commonly present on chips being recycled, especially those comprising aluminum can fragments, and since such vaporizable materials are in fact utilizable according to the method of the present invention for the establishment of the said non-oxidizing environment or atmosphere at the surface of the molten metal pool in the charge well of a reverberatory furnace or the like, steps previously required for the elimination of such impurities, such as fastidiously washing of the chips with detergent and then burning of such residue therefrom, are no longer required, with attendant economy in the overall process of returning the chips to a condition of industrial utilizability. It will moreover be apparent to one skilled in the art that the charge-well cover may be made moveable, especially vertically moveable, in any one of a number of other ways, such as by a chain hoist, cables with attached reels, or the like, and that the same may also be applied to move the hood, which may likewise be made moveable either separately or together with the charge-well cover, which may in appropriate cases even be attached to the hood for movement to and from the surface of the molten metal pool therewith. As an additional aspect of the invention, it is clear that the charge-well cover need not necessarily be attached to or integral with the delivery conduit of the chip charging apparatus employed and that, for example, a suitable aperture may be provided in the said charge-well cover for the insertion of the delivery conduit thereinto or therethrough, for operation of the chip-charging device and its delivery conduit in a normal manner, but in such case with the delivery conduit inserted into the molten metal bath through a suitable aperture provided therefor in the charge-well cover.

Further modifications and embodiments and advantages thereof in a particular case will likewise be readily apparent to one skilled in the art.

DESCRIPTION OF THE DRAWINGS

Reference is now made to the drawings, wherein:

FIG. 1 is a top plan view showing apparatus according to the invention and illustrating the method of the invention in association with a reverberatory furnace having a main chamber, a circulation well, and a charge well, all in communication, the reverberatory furnace and its associated chambers and wells being shown partially schematically and partially in section, a chip-charging device also being shown in association with the charge well with which the charge-well cover of the invention is also associated.

FIG. 1A is a plan view of an alternative charge-well cover according to the invention, in which the cover is unitary, hinged at one side, and provided with a slot for accommodating the delivery conduit of the chip charger.

FIG. 2 is a side elevational view showing apparatus according to the invention and employed in carrying out the method of the invention in association with the charge well of a reverberatory furnace and its associated chip-charging device, the reverberatory furnace and the chip-charging device, as well as the apparatus of the invention, again being shown partially schematically and partially in section, the charge-well cover of the invention in this slightly different embodiment being attached to the delivery conduit of the chip charger and being shown in essential contact with the surface of the molten metal pool in the charge well.

FIG. 3 is like FIG. 2, with the chip charger and its chip-delivery conduit, as well as the attached charge-well cover of the invention, having been moved upwardly and backwardly so as to remove both the charge-well cover and the delivery conduit out of contact with the surface of the molten metal pool in the charge well.

FIG. 4 is a detail of the mechanism shown in FIGS. 2 and 3 for movement of the chip charger and its chip-delivery conduit, and the charge-well cover when attached thereto, from one position to another, so as to move the delivery conduit into and out of the molten metal pool, and so as to bring the charge-well cover when attached into and out of essential contact with the surface of the molten metal pool in the charge well.

DETAILED DESCRIPTION OF THE INVENTION

Figure 5:
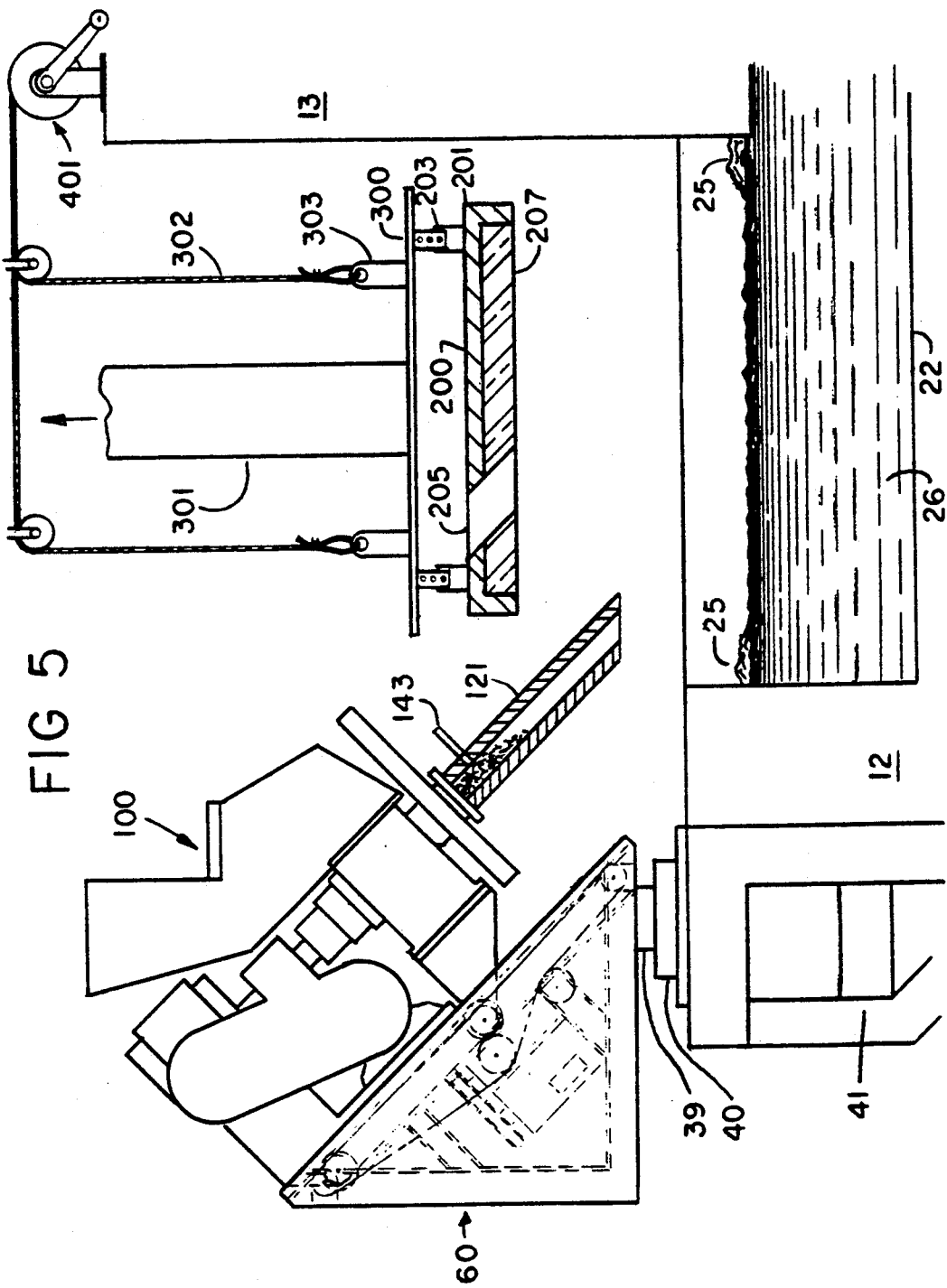
FIG. 5 is a side elevational view like FIG. 2 showing apparatus according to another embodiment of the invention, wherein the charge-well cover is not attached to or integral with the chip-delivery conduit of the chip charger, but is rather suspended by suspending means which also suspend hood means for removing volatile materials and products of combustion from the vicinity of the surface of the molten metal pool and the charge well.

The present invention, in both its method and apparatus aspects, will be more readily understood from the following detailed description, particularly when taken in conjunction with the drawings, in which all of the significant parts are numbered and wherein the same numbers are used to identify the same parts throughout.

A reverberatory furnace, of refractory material or having the usual refractory lining and fired by combustion burners 14 fed by natural gas or fuel oil which throw flames into the interior of main chamber 18 thereof through flame-introduction means 16, is shown in the FIGS. at 10. The furnace well comprises bottom wall 11 and side walls 12 and 13, with a mass of molten metal, preferably and usually aluminum or magnesium or an aluminum or magnesium alloy, therein being shown at 26. The base portions 11 of the furnace may be supported on the underlying floor by means of I-beam supports, neither of which are shown. Main chamber 18 is provided with main chamber extensions 19 in the form of circulation well 20 and charge well 22, connected with each other and with main chamber 18 by means of communicating passageways 24. Molten metal 26, e.g., brass, aluminum, magnesium, titanium, other metals, or alloys thereof, is contained in main chamber 18 and is circulated from the hottest part thereof, indicated at 38, through circulation well 20 and charge well 22 via communicating passageways 24 by circulation means 27 including electrically or otherwise driven motor 30 and its associated circulating means 32, including its associated heat-resistant, e.g., carbide or graphite, impeller, rotor, fan, or blade, all located in circulation well 20. The circulation means 27 comprises no part of the present invention. According to flow pattern 36 as created by circulation means 27, molten metal 26 in furnace main chamber 18 constantly and continuously moves from the hottest point 38 in main chamber 18, through communicating passageways 24 into circulation well 20 and thence into charge well 22 to the coldest point 40, shown in shadow lines adjacent to the point of introduction of a charge of new or used unmelted metal chips C into charge well 22 via chip-charging means 100, through chip-charger delivery conduit or nozzle means 121, e.g., constructed of heat- and flame-resistant material, such as carbide, graphite, or ceramic, of mild or stainless steel, or of such steel plated with such refractory material. The coldest portion of said molten metal pool in charge well 22, indicated in shadow lines by the number 40, is at or near the point at which fresh or used unmelted metal chips to be melted are introduced into the metal pool in charge well 22, as will be well understood by one skilled in the art.

Also visible in FIG. 1 are chip-charger support frame 60 and sprocket and chain means 70,72 whereby chip charger 100 is moved into proximity to molten metal pool 26 in charge well 22 and out of proximity therewith, as well as metal chip storage and infeed hopper 102 through which metal chips entering the chip charger 100 are introduced.

Still referring to FIG. 1, molten metal oxide 25, which ordinarily collects at the surface of the molten metal pool 26, is shown in main well 18, circulation well 20, and in charge well 22, but in charge well 22 only in localized zones or under exit ports 23 about the periphery thereof and centrally thereof, due to the presence in the charge well of heat-resistant and flame-resistant charge-well covers 200 and 202, e.g., comprising a high-temperature-resistant steel exterior 201 and a ceramic interior 207, or the like, the first of which is attached, as by suitable heat-resistant welding, press fitting, fasteners, or the like, or integral with, chip-charger delivery conduit or nozzle 121, and the second of which is hinged at its right-hand side by means of hinges 204, to facilitate clean out. Thus, portion 202 of the heat-resistant and flame-resistant charge-well cover is hinged and otherwise fixed in position over the surface of the molten metal pool 26 in charge well 22, whereas another portion 200 of said heat-resistant and flame-resistant charge-well cover is affixed to or integral with the chip-charger delivery conduit 121 and moveable therewith, as will be further explained hereinafter.

The charge-well cover 200,202 or, as discussed hereinafter 202A, is preferably and advantageously constructed so as to present a structure comprising a hollow interior chamber, such as an inverted box-like steel structure 201 or the like, as shown, thus to provide a hollow interior or enclosed area preferably securing therein ceramic material 207 for the retention of gases or vaporous materials employed according to the invention, such as the inert gas or gas comprising vaporized impurities or contaminants present on the chips charged into the molten metal pool, preferably at the pool surface, and, in its simplest form, may advantageously comprise either such a box-like structure 201 as shown in the drawings or even a simple flat steel plate, preferably having sufficient concavity to provide the preferred and advantageous hollow interior chamber therein, in either case with refractory material 207 secured therein or clad thereto.

From FIG. 1A is seen an alternative embodiment of the invention, wherein the charge-well cover 202A is unitary but hinged at one side, just as partial charge-well cover 202, by means of hinges 204, and provided with slot 206 for the accommodation of chip-charger delivery conduit 121, which may be inserted to the surface of or into the molten metal pool either prior to closing cover 202A over charge well 22 or, alternatively, charge-well cover 202A may be closed in advance of the lowering and/or insertion of chip-charger delivery conduit 121 to the surface of or into the molten metal pool 26 lying in charge well 22 and beneath charge-well cover 202A.

Advantageously the charge-well cover is made upwardly and downwardly moveable not only independently, but also with relation to the height of the molten metal pool in the charge well, in which case the upward and downward movement of the charge-well cover is coordinated with the height of the surface of the molten metal pool in the charge well and, also advantageously, said coordination automatically controlled by sensing means for the height of the molten metal pool, e.g., located in a charge-well wall, and cooperating switch means for activating the means for moving the charge-well cover upwardly or downwardly in response to the signal provided by the said sensing means.

The concept and the physical embodiment of a heat-resistant and flame-resistant cover 200,202,202A for the charge well 22, whether the said cover is fixed or stationary or whether it is moveable or whether all or a part thereof is moveable or hinged, in any event constitutes an essential aspect of the present invention.

Referring now to FIG. 2, the same elements are present, the heat-resistant and flame-resistant charge-well cover 200 in this embodiment being shown as a single integral cover, and not separated into two portions 200 and 202, as shown in FIG. 1. As shown in FIG. 2, the charge-well cover 200 comprises steel box-like structure 201 having a top surface and downwardly-extending walls, an enclosed space or hollow refractory-, e.g., ceramic-, filled interior chamber 207 for the retention at the pool surface of inert gas and/or gas generated by vaporization of impurities from the chips C delivered into molten metal pool 26 at or below the surface thereof by chip-charger delivery conduit 121 and dispersion and melting into the same as shown at P. Also shown is means 143 in the form of an inlet tube, for the introduction of inert gas such as nitrogen or argon into the interior of chip-charger delivery conduit 121 for the prevention of oxidation of chips C therein while en route to point P, but also for the delivery of inert gas to the surface of or into the molten metal pool 26 when such is desired by the operator.

In shadow lines is shown hood means 300 with associated conduitry 301, for the exhaustion of fumes, vapors, and products of combustion which arise from the exit ports 23 provided around the edges of charge-well cover 200, such byproducts of the procedure being led under suitable vacuum or pressure conditions to a point distant from the surface of the metal pool 26 and the charge well 22 for elimination from the atmosphere in any suitable and desired manner, such as by employing the decontamination means previously described. In practice, the hood 300 and its associated conduitry 301 will generally and ordinarily be superposed directly above charge well 22 so as most conveniently to collect the gases, i.e., vaporous byproducts of the procedure, emanating from exit ports 23.

With reference to the chip-charger means 100, as shown in FIG. 2 schematically, the chip charger itself forms no part of the present invention, and such chip chargers are well known from U.S. Pat. No. 4,872,907, which discloses a suitable compactor-extruder means, and U.S. Pat. No. 4,702,768, the disclosures of which patents are incorporated herein by reference, discloses a suitable compacting stripforming or briquetting means, which latter type of charger must only be fitted with a suitable delivery conduit such as 121 when and if such compacting-briquetter means is to be employed, especially when to be attached to or made integral with the charge-well cover 200, as shown in FIGS. 1 and 2.

The chip charger means 100 is accordingly shown only schematically, in FIG. 2, with usual chip infeed hopper 102, housings 103, 104, 105, 106, and 107 for containment of the usual chip feeder elements comprising fingers on a rotating shaft and a screw auger drive, together comprising the details of a usual compactor-extruder of the type disclosed in U.S. Pat. No. 4,872,907 and available from Premelt under that trademark, as well as the screw auger drive motor and feeder drive motor. Rear wall 108 of the chip-charger apparatus is seen in FIG. 2 and is also seen in FIG. 4, a view taken along lines 4—4 of FIG. 3, which will be described hereinafter. Underneath the chip charger apparatus is positioned chip-charger base plate 109, with vertical flanges or extremities 110, as best seen in FIG. 4.

Referring again to FIG. 2, the chip-charger apparatus 100 is mounted adjacent vertical furnace side wall 12 upon support means 41, atop which is mounted plate 40 and surmounting which is vertical cylindrical pillar, post, or shaft 39, which may or may not be journaled for rotation in plate 40, as desired. Shaft 39 is in turn securely attached to horizontal base plate 61 of chip-charger retraction means 60, comprising also rear vertical plate 62, both lower horizontal plate 61 and rear vertical plate 62 being attached to the ends of flat approximately 45° angled hypotenuse plate 63, these plates together forming a triangular mounting upon which the chip charger 100 may move upwardly and backwardly for removal of the delivery conduit 121 thereof from charge well 22 and forwardly and downwardly for introduction of delivery conduit 121 into the said charge well 22. Angled plate 63 comprises side wall extensions 64 which comprise track 73, within which tapered cylindrical rollers 74, on both sides of downwardly-extending vertical flanges 110 of base plate 109 travel, tapered cylindrical rollers 74 being connected by axle 75 which is journaled for rotation in said vertical flanges 110. As will be readily understood by one skilled in the art, the chip-charging device 100 may, instead of being made forwardly and backwardly moveable, simply be made tiltable, by pivoting the entire chip-charge unit 100 about a pivot point located at approximately the location of cylinder or shaft 39 in the present drawings, essentially as described for the chip-charging device in U.S. Pat. No. 4,872,907 and, of course, other suitable means for insertion of the chip-charger delivery conduit 121 into charge well 22 and removal therefrom may also be employed, including the extension and retraction of the delivery conduit 121 as a unit and separate from the chip-charging apparatus as a whole, as again will be apparent to one skilled in the art to which this invention pertains.

Underlying plate 111 attached to vertical flanges 110 is secured at the forward and rearward ends thereof, beneath chip-charging device 100, to chain 72, which is engaged in sprockets 70 mounted in sprocket-mounting means or clevis 69 and retained therein for rotation by pins 71.

The assembly 60 is completed by electric or otherwise-powered (from a source not shown) reversible motor 65, connected through suitable pulley and belt assembly means 68 with torque converter 66, for driving of drive sprocket 67 with its auxiliary sprocket 67A, which engage chain 72 which, as shown in FIG. 4, in turn engages internally mounted sprockets 70 on flat plate 63 below the forwardly- and rearwardly-moveable lowermost base plate 111 below chip-charging apparatus 100.

Thus, when reversible motor 65 is activated, it in turn activates torque converter 66 by means of pulley and belt assembly means 68, in turn activating sprocket 67 which moves chain 72 either forwardly or rearwardly, depending on the direction of rotation of the motor 65, thereby advancing or retracting underlying base plate 111 and the chip-charging device 100 secured thereto and riding thereon, inasmuch as chain 72 is attached to underlying base plate 111 at least at the forward and rearward edges thereof, for introduction of delivery conduit 121 into contact with and removal of delivery conduit 121 from contact with the molten metal pool 26 in charge well 22, as may be desired for carrying out the method of the present invention, as will best be seen from FIG. 2 where the chip-charging apparatus 100 is shown in both retracted and forward positions.

Referring once more to FIG. 2, the metal oxide 25 is shown as accumulating in the areas of the surface of the metal pool 26 not covered by the charge-well cover 22, which areas have been provided as exit ports 23, whereas, in the area covered by the charge-well cover of the invention, the amount of accumulated metal oxide 25 is minimal, due to the provision of inert gas and/or vaporized impurities from the chips between the refractory, e.g., ceramic, material 207 within the inner cavity of cover 200 and in contact with the surface of metal pool 26 in charge well 22.

Referring now to FIG. 3, the same elements are visible, with the exception of the fact that chip charger 100 is now shown in the retracted position, with chip-charger delivery conduit 121 and its attache charge-well cover 200 withdrawn from charge well 22.

In addition, hood 300 with its associated conduitry 301 is now shown superposed above charge well 22 and supported thereover by support means 302 in the form of a chain or cable attached to hood 300 by attaching means in the form of eyeletted tabs 303 and connected to the additional elements of chain hoist means or reel and drum means 401, for raising and lowering the hood means 300 and associated conduitry 301, and particularly for positioning the same above or closely adjacent to the exit ports 23 provided when charge-well cover 200 is in place and especially during the chip-charging operation.

FIG. 5 is like FIG. 3, but shows another embodiment of the invention, wherein the charge-well cover 200 is attached to the lower side of hood means 300 by attaching means in the form of readily releasable snap-lock pin and hose clamp means 203, for ready detachment of cover 200 from hood 300 when placed atop the surface of the metal pool 26 in charge well 22. Another apparent aspect of this embodiment of the charge-well cover 200 as shown in FIG. 5 is the presence of aperture 205 for the insertion thereinto and therethrough of chip-charger delivery conduit 121, once the cover 200 is in place in charge well 22. As an alternative, aperture 205 may also be extended through hood 300 so that, once cover 200 and hood 300 are lowered into charge well 22 as a unit, chip-charger delivery conduit 121 can be inserted therein and therethrough without detachment of cover 200 from the hood, as will be apparent to one skilled in the art.

OPERATION

In operation, the chip-charger of whatever type is first charged with chips in the normal manner, and such charging of chips into the chip charger is continued for as long as chips are desired to be charged into the molten metal pool in the charge well, from a further storage bin or otherwise. When the flame-resistant and heat-resistant cover of the invention is lowered into place at the surface of the molten metal pool and the charge well, the hood evacuation (pressure or vacuum) means is activated and the chip-charger delivery conduit is introduced into and through an aperture in either the detached heat-resistant and flame-resistant cover of the invention or also through a corresponding opening provided in the hood, when the cover means is not detached therefrom, so that in either event the delivery conduit of the chip charger now extends through one or more of said openings and either contacts the molten metal pool at the surface thereof or dips into the molten metal pool beneath the surface thereof. Alternatively, the charge-well cover of the invention may be attached to or integral with the delivery conduit of the chip charger, and may be moved into position atop the surface of the molten metal pool in the charge well simultaneously with bringing the chip-delivery conduit or the entire chip-charging apparatus including the delivery conduit into a position of proximity in which the delivery conduit does contact or dip into the molten metal pool in the charge well at or beneath the surface thereof through one or more openings provided in the cover of the invention and optionally also in the hood of the invention, as previously described under DETAILED DESCRIPTION OF THE INVENTION. Moreover, the delivery conduit may be extended from a retracted position, or the chip-charger delivery conduit, or the entire chip charger including the delivery conduit, may simply be pivoted about a horizontal axis or brought into proximity to the molten metal pool in the charge well for commencement of operations as aforesaid Still alternatively, when the entire charge-well cover 202A is unitary and hinged, as shown in FIG. IA, and provided with slot 206 for clearance of the chip-charger delivery conduit, either before or after closing of the charge-well cover 202A over the molten metal mass within the charge well, it will be apparent that insertion of the chip-charger delivery conduit into the charge well may be effected either before or after closure of the charge-well cover over the molten metal pool in the charge well.

Upon introduction of chips into the molten metal pool, the chips exiting from the delivery conduit melt into the molten metal pool, releasing gas from vaporizable contaminants or impurities present thereon, which rise to the surface of the pool and are there maintained by the charge-well cover of the invention, thereby providing a non-oxidizing atmosphere at the surface of the molten metal pool lying therebeneath, while vapors or gases escaping such entrapment exit via exit ports and usually flame upon entering the ambient air, which provides an oxidizing environment. An inert gas may be simultaneously introduced into the molten metal pool by means independent of the chip-delivery conduit or through the chip-delivery conduit itself. This inert gas also rises upwardly and is collected by and trapped by the charge-well cover, maintained a the pool surface, and thus also provides a non-oxidizing atmosphere or environment at the surface of the molten metal in the charge well. By providing exit ports around the edges of or in the charge-well cover of the invention, vaporizable and flammable impurities on the chips will vaporize and rise to the surface and escape, at least partially, as gas through said exit ports, where they will oxidize and become inflamed. Whether or not flamed at this point, the escaping vaporized gas from oil, grease, lacquer or the like on the chips being melted into the molten metal pool, and products of combustion thereof, will be drawn into the hood and its associated conduitry where it will travel to a point distant from the charge well and the molten metal pool for disposal through suitable decontamination equipment, as already described.

If it is desired to eliminate the inert gas, and rely only upon the vaporizable contaminants present on the chips, this may be conveniently done, or the amount of inert gas can simply be reduced, and any desired proportion of the two may be maintained according to the amount of vaporizable impurities or contaminants present on the chips to be charged into the molten metal pool and other factors within the control of the operator. When no inert gas is employed, as is frequently possible when fragmented aluminum cans with a high proportion of lacquer or other vaporizable interior coating thereon are employed, the vaporization of such impurities upon contact with the molten metal pool releases such vaporizable impurities, which rise upwardly and are retained at the pool surface by the charge-well cover, thereby providing the necessary and desirable non-oxidizing atmosphere or environment, whereby all of the advantages of the invention as previously listed and described are attained. Meanwhile, by the employment of exit ports in predetermined and controlled areas in or about the charge-well cover, and utilization of a hood and associated conduitry in accord with the invention, such portions of the vaporizable impurities which do rise to the surface and escape through the exit ports, with or without flaming at the surface of the molten metal pool, will be quickly "vacuumed" up by the hood and carried to appropriate means for disposal thereof with minimal contamination of the atmosphere and environmental pollution. Even though such emissions cannot be eliminated, they can be greatly reduced, and the provision of the charge-well cover of the invention in combination with exit ports in predetermined locations makes the emissions much more controllable than in the past and therefore readily adapted to further diminution by the hood means with associated conduitry as also provided according to the present invention, as well as ultimate final disposal with minimal environmental pollution.

IN GENERAL

The method and apparatus of the present invention is particularly adapted for use in connection with non-magnetic metal scrap such as brass, aluminum, aluminum alloys, and the like, and such nonmagnetic metal scrap may conveniently be separated from a mass of metal scrap including also ferrous, ferric, or other magnetic chips by the employment of magnetic separation means, as is now well known and established in the art.

Moreover, the chip-charging apparatus, as is now already well-established in the art, may have its delivery conduit introduced into contact with or beneath the molten metal pool in the charge chamber and removed therefrom by any one of numerous means, such as by retracting, pivoting, or otherwise elevating the delivery conduit and/or entire chip-charging apparatus so as to place the delivery conduit into or in contact with or remove the delivery conduit out of contact with the molten metal pool, and that such introduction to or into and removal from can if desired be coordinated with temperature readings in the charge well so as to ensure that an adequate temperature is sensed in or near the point of introduction into the molten metal pool so that any potential danger in the form of excessive crystallization or solidification due to a temperature drop in the vicinity of the metal introduction is eliminated by diminution of the rate of metal introduction or by discontinuation until the temperature rebounds to a safe level.

It will, in addition, be readily apparent to one skilled in the art that the exact conduitry employed in connection with the associated hood means of the present invention can be widely varied according to the skill of the art and that the means employed to enable the movement upward and downward movement of the hood means and/or the charge-well cover means, whether singly or in combination, can take many forms, any of which are suitable and which will be determined according to the skill of the art to fit particular structures and/or conditions as they exist or are provided in the immediate vicinity of the charge well.

Whereas, in this Specification and claims, reference is frequently made to "metal chips", this is to be understood as encompassing metal chips of various almost unlimited proportions, configurations, and dimensions, but particularly to include small pieces and/or particles, likewise of extremely variable dimensions, and in general the term "metal chips" is employed herein as having the usual meaning to one skilled in the art, being inclusive not only of parts, pieces, particles, and fragments of the usual type from scrap, but also previously-unused metal in standard or odd configurations remaining from previous molding, extruding, casting, rolling, or like metal processing operations, and it goes without saying that inconveniently large pieces can be reduced in size in any convenient manner and employed as metal chips and that, accordingly, any suitable metal, whether scrap or otherwise, can be converted into chips and employed in the method and apparatus of the invention, whether new metal or previously used metal, including even and especially new and used aluminum sheet and can scrap, when it is determined that such further processing into new metal is required or desired by the operator.

It is thereby seen from the foregoing that the objects of the present invention have been accomplished and that a novel, efficient, and economic process for the introduction of metal chips into a molten pool of metal, especially metal of which said chips are formed or an alloy thereof, involving the maintenance of a non-oxidizing atmosphere or environment at the surface of the molten metal pool, all in accord with the foregoing, has been provided thereby, as well as apparatus for use in carrying out the said process, preferably involving the employment of both appropriate charge-well cover and associated hood means, and whereby all of the previously-mentioned advantages have been attained and the shortcomings of the prior art have been obviated.

Although the preferred embodiments of the invention have been illustrated in the accompanying drawings and described in the foregoing description, it is to be understood that the invention is not limited to the embodiments disclosed or to the exact details of operation or exact compounds, compositions, methods, or procedures shown and described, inasmuch as the invention is capable of numerous modifications, rearrangements, and substitutions of parts and elements and other equivalents, whether metallurgical, chemical, or mechanical, without departing from the spirit or scope of the invention, as will readily be apparent to one skilled in the art, wherefore the present invention is to be understood as limited only by the full scope which can be legally accorded the appended claims.

We claim:

1. A method for the industrial utilization of metal chips which involves the introduction of metal chips into a molten metal pool in a charge well of a furnace for melting therein, comprising the steps of:
   providing a molten metal pool in a charge well of a furnace,
   providing metal chips and introducing said chips into said well, and
   providing a non-oxidizing atmosphere at the surface of the molten metal pool in the said charge well,
   wherein non-oxidizing atmosphere at the surface of the molten metal pool in the charge well is provided by providing an inert gas at the surface of the molten metal pool or by generating gas within said molten metal pool by vaporizing vaporizable contaminants on chips introduced into said pool, and retaining said gas at the surface of said molten metal pool in said charge well with a heat- and flame-resistant cover over at least a substantial portion of said molten metal pool in said charge well and so located and adapted for such purpose, and
   wherein at least a portion of said cover is moveable into and out of position at the surface of the molten metal pool in the charge well and including the step of moving said moveable portion of said cover into position atop said pool.

2. A method of claim 1, wherein the non-oxidizing atmosphere at the surface of the molten metal pool is provided by an inert gas.

3. A method of claim 1, wherein the non-oxidizing atmosphere at the surface of the molten metal pool in the charge well is provided by gas generated by vaporization of vaporizable contaminants on metal chips introduced into the charge well.

4. A method of claim 1, wherein the non-oxidizing atmosphere at the surface of the molten metal pool in the charge well is provided by a combination of an inert gas and gas generated by vaporization of vaporizable contaminants on metal chips introduced into said charge well.

5. A method of claim 1, wherein said moveable portion of said cover is moved into position atop said molten metal pool in the charge well concurrently with the insertion of a delivery conduit of a chip-charging device into said charge well.

6. A method of claim 1, wherein the metal chips introduced into said well comprise magnesium or aluminum or an alloy thereof.

7. A method of claim 6, wherein the metal chips introduced into said well comprise fragmented aluminum or aluminum alloy cans.

8. A method of claim 1, wherein the metal chips introduced into said charge well comprise used beverage can fragments.

9. A method of claim 1, wherein the non-oxidizing atmosphere is generated by the vaporization of oil, grease, other hydrocarbons, lacquer, or other vaporizable material contained as a contaminant or impurity on metal chips introduced into said molten metal pool in said charge well.

10. A method of claim 1, wherein at least a portion of said cover is upwardly and downwardly moveable with relation to the height of the molten metal pool in said charge well and its movement is coordinated therewith.

11. A method of claim 1, wherein an opening is provided in said cover for the passage of a delivery conduit of a chip-charging device therethrough so as to permit the charging of metal chips into said charge well when said cover is in place on said charge well, and introducing metal chips into said charge well through said delivery conduit.

12. A method of claim 1, wherein said cover comprises a refractory material and including the step of contacting said refractory material with the surface of said molten metal pool.

13. A method of claim 12, wherein said cover comprises a downwardly-opening cavity containing a refractory material and including the step of contacting the said refractory material in said cavity with the surface of said molten metal pool.

14. A method for the industrial utilization of metal chips which involves the introduction of metal chips into a molten metal pool in a charge well of a furnace for melting therein, comprising the steps of:
providing a molten metal pool in a charge well of a furnace,
providing metal chips and introducing said chips into said well, and
providing a non-oxidizing atmosphere at the surface of the molten metal pool in the said charge well,
wherein non-oxidizing atmosphere at the surface of the molten metal pool in the charge well is provided by providing an inert gas at the surface of the molten metal pool or by generating gas within said molten metal pool by vaporizing vaporizable contaminants on chips introduced into said pool, and retaining said gas at the surface of said molten metal pool in said charge well with a heat- and flame-resistant cover over at least a substantial portion of said molten metal pool in said charge well and so located and adapted for such purpose, and
including the step of providing exit ports in or around said charge-well cover to permit the escape of gas from within said molten metal pool which is not retained by said cover and collecting the same or products of combustion thereof.

15. A method of claim 14, including the step of collecting and entraining effluent gas and products of combustion thereof escaping from said exit ports in an air stream and decontaminating the same before releasing them into the environment.

16. A method of claim 15, wherein said collection and entrainment of said gas and products of combustion thereof is effected by providing a hood and associated conduitry superposed above said charge well and said molten metal pool therein and adjacent said exit ports.

17. A method for the industrial utilization of metal chips which involves the introduction of metal chips into a molten metal pool in a charge well of a furnace for melting therein, comprising the steps of:
providing a molten metal pool in a charge well of a furnace,
providing metal chips and introducing said chips into said well, and
providing a non-oxidizing atmosphere at the surface of the molten metal pool in the said charge well,
wherein non-oxidizing atmosphere at the surface of the molten metal pool is provided by an inert gas, and
wherein the inert gas comprises nitrogen or argon.

18. A method for the industrial utilization of metal chips which involves the introduction of metal chips into a molten metal pool in a charge well of a furnace for melting therein, comprising the steps of:
providing a molten metal pool in a charge well of a furnace,
providing metal chips and introducing said chips into said well, and
providing a non-oxidizing atmosphere at the surface of the molten metal pool in the said charge well,
wherein non-oxidizing atmosphere at the surface of the molten metal pool in the charge well is provided by providing an inert gas at the surface of the molten metal pool or by generating gas within said molten metal pool by vaporizing vaporizable contaminants on chips introduced into said pool, and retaining said gas at the surface of said molten metal pool in said charge well with a heat- and flame-resistant cover over at least a substantial portion of said molten metal pool in said charge well and so located and adapted for such purpose,
wherein exit ports are provided in or around said cover when said cover is in place over said charge well to permit the controlled escape of gas from said charge well.

19. A method for the industrial utilization of metal chips which involves the introduction of metal chips into a molten metal pool in a charge well of a furnace for melting therein, comprising the steps of:
providing a molten metal pool in a charge well of a furnace,
providing metal chips and introducing said chips into said well, and
providing a non-oxidizing atmosphere at the surface of the molten metal pool in the said charge well,
wherein non-oxidizing atmosphere at the surface of the molten metal pool in the charge well is provided by providing an inert gas at the surface of the molten metal pool or by generating gas within said molten metal pool by vaporizing vaporizable contaminants on chips introduced into said pool, and retaining said gas at the surface of said molten metal pool in said charge well with a heat- and flame-resistant cover over at least a substantial portion of said molten metal pool in said charge well and so located and adapted for such purpose,
wherein said cover or a portion thereof is connected to or integral with a delivery conduit of a chip-charging device for movement therewith and including the step of moving said cover or said portion thereof together with said delivery conduit into and out of position with respect to said charge well and said molten metal pool therein.

20. Apparatus for use in conjunction with the charge well of a furnace having therein a molten metal pool into which metal chips are introduced for melting, comprising a heat- and flame-resistant cover adapted to lie at or in close proximity to the surface of said molten metal pool, to cover at least a substantial portion of the area of said charge well, and so located and adapted to retain inert gas or gas generated by vaporization of vaporizable contaminants introduced into said molten metal pool at the surface of said molten metal pool in said charge well over a substantial portion of the surface thereof and thus to maintain a non-oxidizing atmosphere at the surface of said molten metal pool in said charge well,
including means for moving said cover or a moveable portion thereof into and out of said charge well and into and out of proximity to and/or contact with said molten metal pool therein.

21. Apparatus of claim 20, wherein said cover comprises an opening for the passage of a delivery conduit of a chip-charging device therethrough so as to permit introduction of metal chips into said molten metal pool in said charge well when said cover is in place thereon.

22. Apparatus of claim 20, wherein said cover comprises a refractory material.

23. Apparatus of claim 22, wherein said cover comprises a downwardly-opening cavity containing refractory material.

24. Apparatus of claim 22 in place in a furnace charge well.

25. Apparatus of claim 20 in place in a furnace charge well.

26. Apparatus of claim 21 in place in a furnace charge well.

27. Apparatus for use in conjunction with the charge well of a furnace having therein a molten metal pool into which metal chips are introduced for melting, comprising a heat- and flame-resistant cover adapted to lie at or in close proximity to the surface of said molten metal pool, to cover at least a substantial portion of the area of said charge well, and so located and adapted to retain inert gas or gas generated by vaporization of vaporizable contaminants introduced into said molten metal pool at the surface of said molten metal pool in said charge well over a substantial portion of the surface thereof and thus to maintain a non-oxidizing atmosphere at the surface of said molten metal pool in said charge well, wherein said cover or a moveable portion thereof is associated with a moveable delivery conduit of a chip-charging device for movement together with said delivery conduit.

28. Apparatus of claim 27, wherein said charge-well cover or a moveable portion thereof is connected to or integral with a delivery conduit of a chip-charger and moveable together therewith.

29. Apparatus of claim 27 in place in a furnace charge well.

30. Apparatus for use in conjunction with the charge well of a furnace having therein a molten metal pool into which metal chips are introduced for melting, comprising a heat- and flame-resistant cover adapted to lie at or in close proximity to the surface of said molten metal pool, to cover at least a substantial portion of the area of said charge well, and so located and adapted to retain inert gas or gas generated by vaporization of vaporizable contaminants introduced into said molten metal pool at the surface of said molten metal pool in said charge well over a substantial portion of the surface thereof and thus to maintain a non-oxidizing atmosphere at the surface of said molten metal pool in said charge well, wherein at least a portion of said charge-well cover is hingedly-connected with said charge well.

31. Apparatus for use in conjunction with the charge well of a furnace having therein a molten metal pool into which metal chips are introduced for melting, comprising a heat- and flame-resistant cover adapted to lie at or in close proximity to the surface of said molten metal pool, to cover at least a substantial portion of the area of said charge well, and so located and adapted to retain inert gas or gas generated by vaporization of vaporizable contaminants introduced into said molten metal pool at the surface of said molten metal pool in said charge well over a substantial portion of the surface thereof and thus to maintain a non-oxidizing atmosphere at the surface of said molten metal pool in said charge well, wherein said cover is upwardly and downwardly moveable with relation to the height of the molten metal pool in said charge well.

32. Apparatus for use in conjunction with the charge well of a furnace having therein a molten metal pool into which metal chips are introduced for melting, comprising a heat- and flame-resistant cover adapted to lie at or in close proximity to the surface of said molten metal pool, to cover at least a substantial portion of the area of said charge well, and so located and adapted to retain inert gas or gas generated by vaporization of vaporizable contaminants introduced into said molten metal pool at the surface of said molten metal pool in said charge well over a substantial portion of the surface thereof and thus to maintain a non-oxidizing atmosphere at the surface of said molten metal pool in said charge well, wherein exit ports are provided in or around said cover when said cover is in place over said charge well, and including associated means for collecting and entraining gas and products of combustion thereof emanating from said molten metal pool in the form of a superposed hood and associated conduitry.

33. Apparatus of claim 32, wherein said hood is moveable upwardly and downwardly along with said charge-well cover or a moveable portion thereof.

34. Apparatus of claim 32 in place in a furnace charge well.

35. Apparatus for use in conjunction with the charge well of a furnace having therein a molten metal pool into which metal chips are introduced for melting, comprising a heat- and flame-resistant cover adapted to lie at or in close proximity to the surface of said molten metal pool, to cover at least a substantial portion of the area of said charge well, and so located and adapted to retain inert gas or gas generated by vaporization of vaporizable contaminants introduced into said molten metal pool at the surface of said molten metal pool in said charge well over a substantial portion of the surface thereof and thus to maintain a non-oxidizing atmosphere at the surface of said molten metal pool in said charge well, wherein exit ports are provided in or around said cover when said cover is in place over said charge well to permit the controlled escape of gas from said charge well.

* * * * *

UNITED STATES PATENT AND TRADEMARK OFFICE
CERTIFICATE OF CORRECTION

PATENT NO. : 5,211,744
DATED : May 18, 1993
INVENTOR(S) : Larry D. Areaux and Robert J. Behnke It is certified that error appears in the above-indentified patent and that said Letters Patent is hereby corrected as shown below:

Col. 3, between lines 35 and 36; insert -- providing a molten metal pool in a charge well of a furnace, -- (indented).
Col. 6, line 55; insert comma after "(760° C.)".
Col. 9, line 5; "It" should be the start of a new paragraph.
Col. 14, line 25; "attache" should read -- attached --.
Col. 15, line 28; insert period after "aforesaid".
Col. 15, line 54; "a" should read -- at --.
Col. 16, line 56; insert -- the -- before "entire".

Signed and Sealed this

Tenth Day of May, 1994

*Attest:*

BRUCE LEHMAN

*Attesting Officer*  *Commissioner of Patents and Trademarks*